June 4, 1968  W. C. GAINES, JR  3,386,232
POCKET-TYPE FILTER
Filed April 22, 1965  4 Sheets-Sheet 1
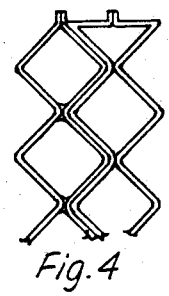
Fig. 4
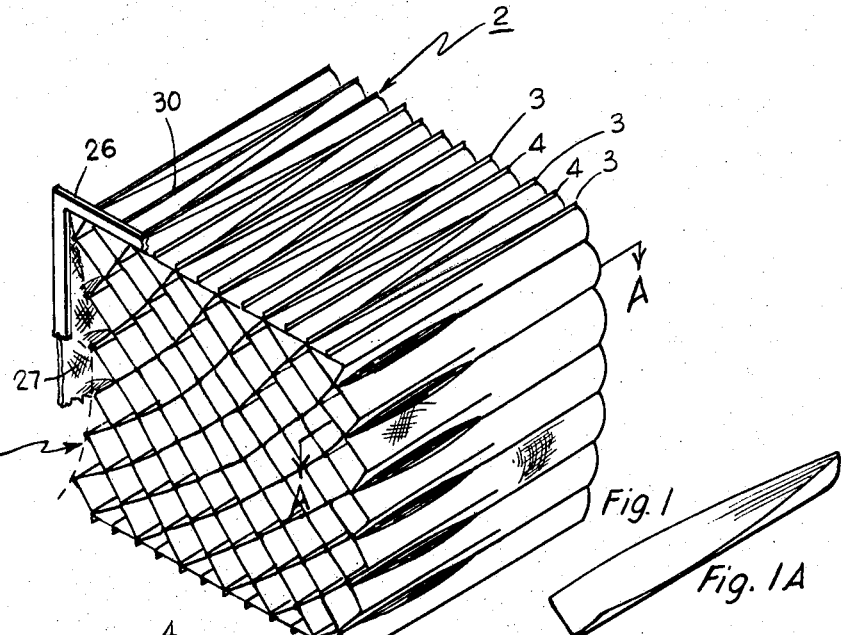
Fig. 1
Fig. 1A
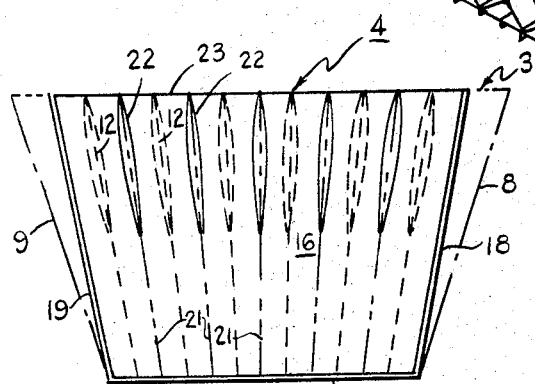
Fig. 3
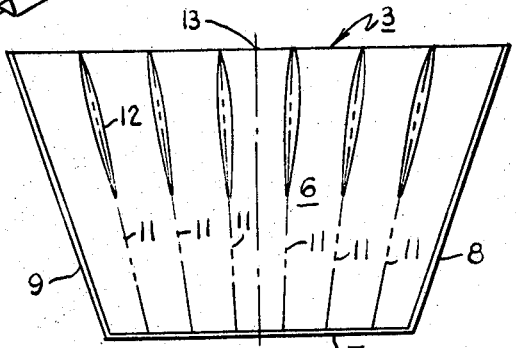
Fig. 2
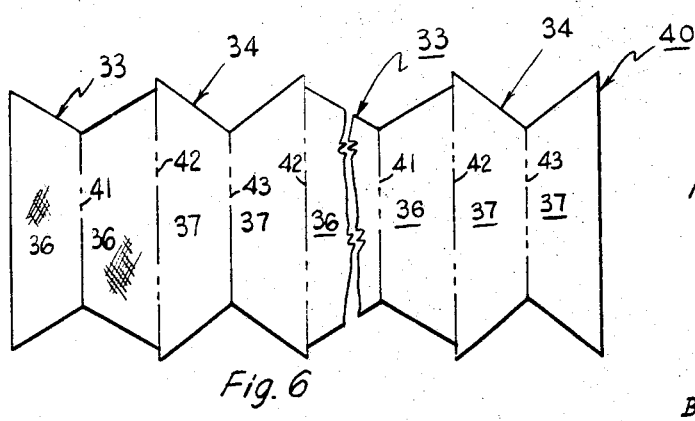
Fig. 6
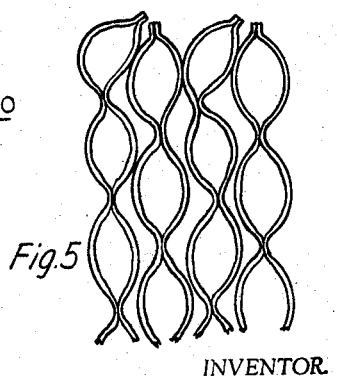
Fig. 5
INVENTOR.
William C. Gaines, Jr.
BY Ralph B. Brick

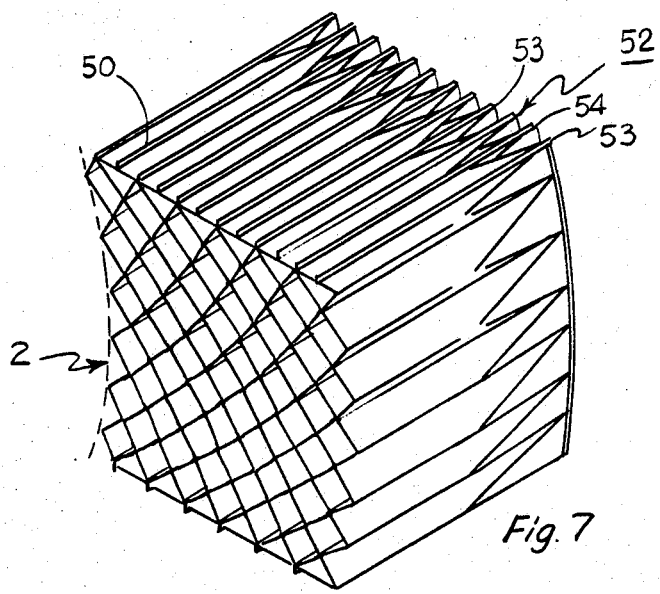
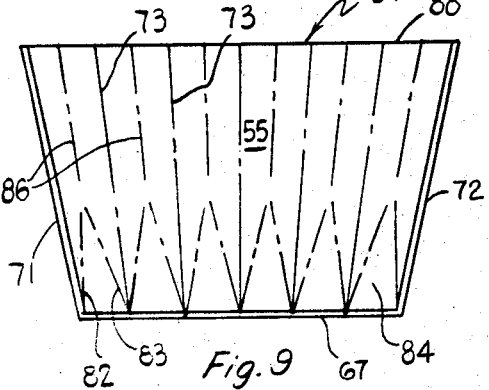
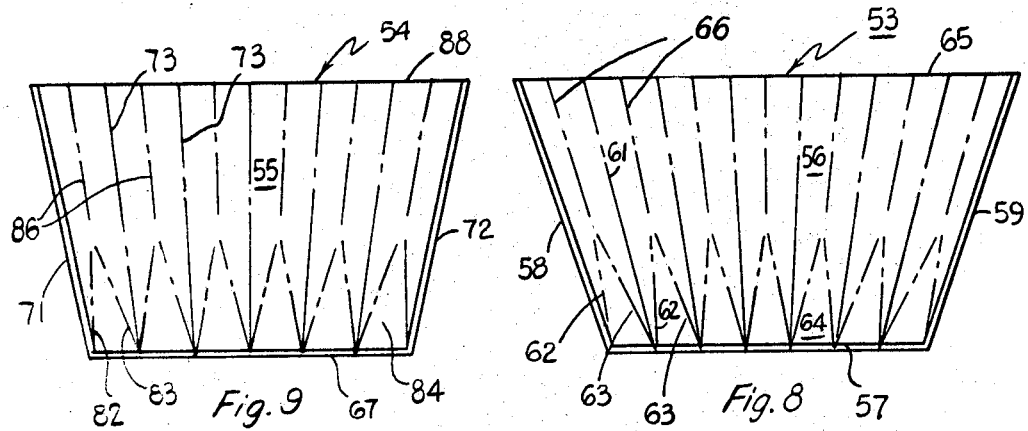

June 4, 1968  W. C. GAINES, JR  3,386,232
POCKET-TYPE FILTER
Filed April 22, 1965  4 Sheets-Sheet 3

INVENTOR.
William C. Gaines, Jr.
BY Ralph B. Brick

June 4, 1968 W. C. GAINES, JR 3,386,232
POCKET-TYPE FILTER
Filed April 22, 1965 4 Sheets-Sheet 4
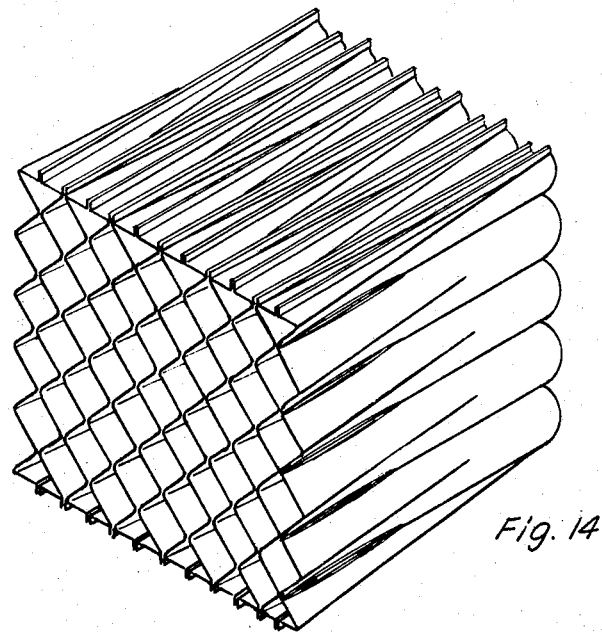
Fig. 14
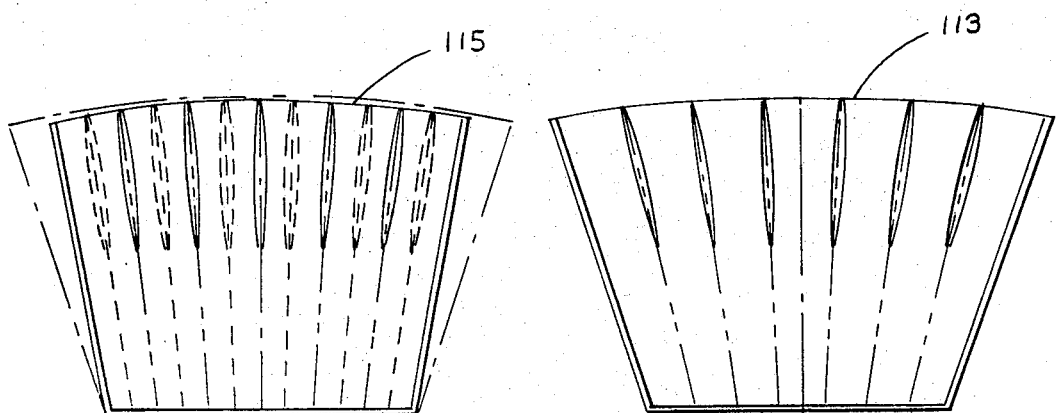
Fig. 16 (3)   Fig. 15 (2)
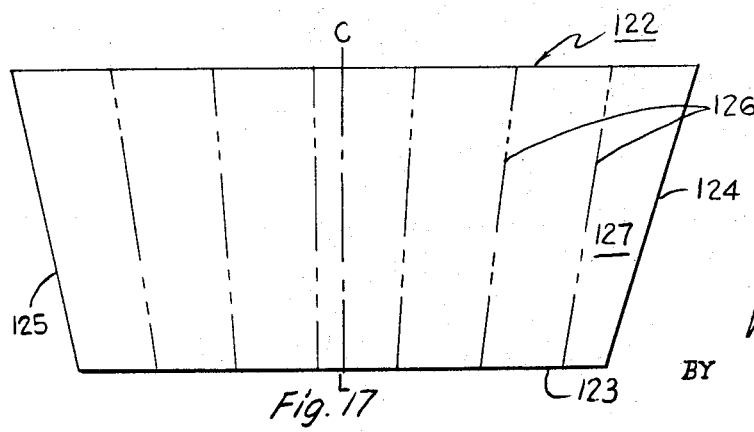
Fig. 17
INVENTOR.
William C. Gaines, Jr.
BY Ralph B. Brick 
United States Patent Office 3,386,232
Patented June 4, 1968

3,386,232
POCKET-TYPE FILTER
William C. Gaines, Jr., Louisville, Ky., assignor to American Air Filter Company, Inc., Louisville, Ky., a corporation of Delaware
Filed Apr. 22, 1965, Ser. No. 450,132
10 Claims. (Cl. 55—500)

ABSTRACT OF THE DISCLOSURE

A pocket-type fluid filter arrangement wherein the pocketed pleats of filter pleat sets are positioned in alternating side-by-side relationship with the pockets of one set offset from the pockets of the other and the pleats joined at the mouth-forming portions of the pockets only.

---

The present invention relates to fluid filters and more particularly to improved, high-efficiency, pocket-type air filters.

Various arrangements for presenting maximum filter medium in a given air treating space are known in the art, including pocket-type filters comprised of tubular bags or socks supported in cantilever fashion in the air stream to be treated. In some of these arrangements, individual securing mechanisms have been required for each bag or sock to properly support the same in the air stream, such individual securing mechanisms necessarily being costly in construction, erection, operation, and maintenance. A number of pocket-type filter arrangements recently have been introduced to eliminate the need for individual securing mechanisms for each of the individual bags. For the most part, these arrangements have required comparatively complex, bulky, and difficult to assemble header mechanisms to support the pocket members in open position. In addition, these arrangements frequently have required complex suspension structures to hold the pocket members in appropriately suspended position along the path of the air stream. Further, these past arrangements have included support mechanisms which have offered substantial resistance to the flow of the treated air stream and which have not always permitted the pocket members to open in such a manner as to be free of contact with those members immediately adjacent thereto.

The present invention provides a straightforward and economical pocket-type filter arrangement which avoids the disadvantages inherent with past arrangements. In accordance with the present invention, a pocket-type filter cartridge arrangement of predetermined configuration is provided which can be readily and efficiently assembled from a collapsed package unit into a filter assembly, the resulting assembly presenting a maximum of face opening and filter medium to an air stream to be treated with a minimum of resistance to the flow thereof and a minimum of stress to the filter assembly. Further, the present invention provides a readily storable filter unit assembly which can be rapidly and economically installed, removed and replaced. In addition, the present invention provides a pocket-type filter arrangement which can be constructed from a continuous filter medium blank in a straightforward and economical manner.

Various other features of the present invention will become obvious to one skilled in the art upon reading the disclosure set forth hereinafter.

More particularly, the present invention provides a pocket-type fluid filter cartridge comprising: first and second filter pleat sets with the pleats of the sets positioned in alternating parallel side-by-side relationship, each of the pleats of each set including a pair of peat-forming sections of filter medium joined together in end-to-end fashion along a common line and folded to face each other to form the pleat, the pleat having spaced seams extending transverse to the common line to joint the facing sections of the pleat and form a plurality of open-mouth pocket members, the seams of the pleats of one pleat set being laterally offset in relation to the seams of the pleats of the other pleat set with adjacent pleat sections of the alternating pleats of the pleat sets joined together at the mouth-forming portions thereof only to provide a honeycomb-like arrangement of fluid inlets when the filter cartridge is placed in open position during fluid-treating operations.

It is to be understood that various changes can be made in the arrangement, form and construction of the apparatus disclosed herein without departing from the scope or spirit of the present invention.

Referring to the drawings:

FIGURE 1 is an isometric view of a pocket-type filter unit incorporating some of the features of the present invention;

FIGURE 1A is a schematic cross-sectional view of a portion of one pocket member taken in a plane passing through line A—A of FIGURE 1, disclosing the tapered nature of the pocket member;

FIGURE 2 is a plan view of a pleat section of one of the pleats of one pleat set of the two pleat sets embodied in the filter unit of FIGURE 1;

FIGURE 3 is a plan view of a pleat section of one of the pleats of the other pleat set of the two pleat sets embodied in the filter unit of FIGURE 1, the phantom lines in this figure indicating the relative position of an adjacent pleat of the other pleat set upon assembly;

FIGURE 4 is an enlarged front view of a portion of the filter unit of FIGURE 1 looking toward the downstream end of such filter unit;

FIGURE 5 is an enlarged cross-sectional view of a portion of the filter unit of FIGURE 1 looking toward the upstream end of the filter unit;

FIGURE 6 is a schematic plan view of a blank of filter medium disclosing one arrangement which can be utilized in forming an inventive filter unit;

FIGURE 7 is an isometric view of a modified pocket-type filter unit incorporating some of the features of the present invention;

FIGURE 8 is a plan view of a pleat section of one of the pleats of one pleat of the two pleat sets embodied in the filter unit of FIGURE 7;

FIGURE 9 is a plan view of a pleat section of one of the pleats of the other pleat set of the two pleat sets embodied in the filter unit of FIGURE 7;

FIGURE 14 is an isometric view of still another modified pocket-type filter unit incorporating some of the features of the present invention;

FIGURE 15 is a plan view of a pleat section of one of the pleats of one pleat set of the two pleat sets embodied in the filter unit of FIGURE 14;

Figure 11:
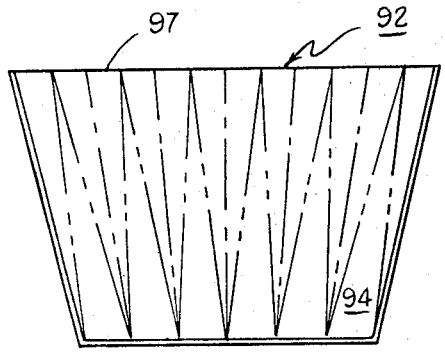
FIGURE 11 is a plan view of a pleat section of one of the pleats of the other pleat set of the two pleat set of FIGURE 10.

FIGURE 16 is a plan view of a pleat section of one of the pleats of the other pleat set of the two pleat set of FIGURE 14; and FIGURE 17 is a plan view of a pleat section of another type of pleat, a number of which can be utilized to form two pleat sets with the pleats of the sets being in alternating sequence to provide a pocket-type filter unit, it being noted that this type of pleat has one pocket therein of narrower breadth than the other pockets so that when the pleat is placed in reverse position the seams of adjacent pleats are in laterally offset relationship.

Referring to FIGURES 1 to 5 of the drawings, pocket-type filter 2 of the present invention is disclosed. Pocket-type filter 2 can be formed from any one of a number of known, suitable filter materials. For example, a porous filter paper material in single sheet or laminated form can be utilized, as can a woven fabric or fibrous glass-type material. If desired, the filter medium can be faced with a suitable scrim backing to improve filter tensile strength and enhance pocket support in the air stream to be treated. To form pocket-type filter 2, two filter medium pleat sets 3 and 4 are utilized with the pleats of the two sets arranged in side-by-side alternating parallel relationship. Each of the pleats of set 3 (FIGURE 2) includes a pair of pleat-forming sections 6 of filter medium of a suitable type. It is to be understood that although only one such pleat section 6 of a pair is disclosed in FIGURE 2 of the drawings, the other section of such pair is substantially identical in configuration, and to form a pleat of set 3, can be placed in faced relation with disclosed section 6 for seaming together with such section along downstream common line 7 and along spaced side seams 8 and 9 which extend transverse line 7. It further is to be understood that the two pleat sections which form a pleat can be made from a suitable symmetrically-shaped single integral blank folded about common line 7 so that the integral sections face each other to form a pleat of the set.

In addition to seams 8 and 9 extending along the sides of a pleat of set 3, each pleat of set 3 is provided with spaced seams 11 intermediate to side seams 8 and 9 and transverse to common line 7, to further join facing sections 6 of the pleat and form a plurality of open-mouth pocket members in the pleat. It is to be noted that each seam 11 is provided with tapered dart configuration 12. Each dart 12 has a lateral breadth at its intermediate portion greater than at its extremities, the dart extending from mouth-forming edge 13 of pleat 3 toward line 7 a suitably selected distance somewhere in the range of approximately one fourth the total distance between edge 13 and line 7 and the over-all total distance. Advantageously, darts 12 are arranged to extend approximately five sevenths of the total distance between edge 13 and line 7.

Each of the pleats of set 4 (FIGURE 3) includes a pair of pleat forming sections 16 of filter medium. As with the pleats of set 3 aforedescribed, it is to be understood that although only one such section 16 of a pair is disclosed in FIGURE 3 of the drawings, the other section of such pair is substantially identical in configuration and, to form a pleat, can be placed in faced relationship with the disclosed section for seaming together with such section along downstream common line 17 and spaced side seams 18 and 19 which extend transverse to line 17. It further is to be understood that the two sections 16 comprising a pleat of set 4 can be formed from a suitably symmetrically-shaped single integral blank folded about common line 17 so that the integral sections face each other to form a pleat of the set.

In addition to side seams 18 and 19 extending along the sides of a pleat of the set 4, each pleat of set 4 is provided with spaced seams 21 intermediate to side seams 18 and 19 and transverse common line 17 to further join facing sections 16 of the pleat and form a plurality of open-mouth pocket members in the pleat. Like pleat set 3, it is to be noted that each seam 21 is provided with tapered dart configuration 22. Each dart 22 has a lateral breadth at its intermediate portion greater than at its extremities, the dart extending from mouth-forming edge 23 of pleat 4 toward line 17 a suitably selected distance somewhere in the range of approximately one fourth the total distance between edge 23 and line 17 and the overall total distance. Advantageously, darts 22 are arranged to extend approximately five sevenths of the total distance between edge 23 and line 17.

It is to be noted that the formed pleats of set 3 (FIGURE 2) and those of set 4 (FIGURE 3) can be of trapezoidal configuration with the mouth-forming edges 13 and 23 having a greater breadth than the common lines 7 and 17 respectively. With such a trapezoidal configuration, each of the pocket-forming pleats of sets 3 and 4 takes on a tapered shape when assembled and placed in open position with the pleats tapering inwardly from mouth to downstream end in a plane perpendicular to the general plane of the pleat that lies intermediate the pleat sections. This tapered shape serves to reduce the possibilities of pleat contact and to enhance air flow between the pleats. In addition, tapered darts 12 and 22 adjacent the mouth portions of the pockets of pleat sets 3 and 4 serve to gather the filter medium adjacent the mouths of the pockets of each pleat to further reduce the possibilities of adjacent pleat and pocket contact and to further enhance air flow through the unit filter. Furthermore, it is to be noted that spaced seams 11 and 21 converge toward the common lines 7 and 17 respectively when the pleats are in collapsed position (FIGURES 2 and 3). Accordingly, when the pleats are in open position (FIGURE 1), each pocket member of each individual pleat, like the pleat itself, takes on a tapered shape with each pocket tapering inwardly from mouth to downstream end in a plane perpendicular to the general plane of the pleat intermediate the pleat sections (FIGURE 1A). Thus, a tapered shape which reduces pleat contact and enhances air flow is arrived at for each individual pocket as well as the pleat in an expedient and economical manner. In addition to the novel tapering arrangement aforedescribed, it is to be noted that mouth-forming edges 13 and 23 are straight in nature. Accordingly, in the embodiment of the invention as set forth in FIGURES 1–6 of the drawings, when the pleats of the filter cartridge are extended to open position the surface determining the mouth portion of the cartridge as it extends between end seams 8, 9 and 18, 19 is curved with the curve being catenary-like in shape, attention being directed to dotted line y of FIGURE 1. This catenary-like shape serves to minimize the structural stress concentrations on the filter medium when it is placed in the air stream for fluid treating operations, eliminating rigid support members which would create additional resistance to the air stream and which might otherwise be required when the media is of flexible nature. At the same time due to the offsetting of the pocket mouths which produces the honeycomb-like arrangement, a maximum of face opening is presented to the air stream to be treated.

In assembling the pleats of pleat sets 3 and 4 to form pocket-type filter member 2, the pleats of the sets are arranged in alternating parallel, side-by-side relationship. In this connection, it is to be noted that seams 7 and 17 of sets 3 and 4, respectively, are of substantially the same breadth, whereas edges 13 of set 3 are of greater breadth than edges 23 of set 4 with pleat set 3 having one more seam and thus one more pocket forming member than pleat set 4. It also is to be noted that pocket forming seams 11 of set 3 are laterally offset from pocket-forming seams 21 of set 4 when the pleat sets are assembled as a unit. Since the breadth of the two sets differ assuming the sets are properly aligned in alternating relationship, when the pockets are expanded a block-like shaped unit form (FIGURE 1) can be obtained by folding over a portion of the end pockets of the pleats of greater breadth as at 30. Once the pleats of the two sets are properly positioned in side-by-side, parallel alternating relationship, adjacent pleat sections 6 and 16 of the alternating pleats of the two pleat sets are joined together along the mouth-forming edges 13 and 23 only. When this has been accomplished, pocket-type filter cartridge, collapsible in nature for ready storage and shipment has been formed. It is to be understood that although pleat-forming sections 6 and 16 are disclosed as being of trapezoidal configuration with straight line mouth-forming edges 13 and 23, respectively, to obtain the stress reducing catenary-like effect upon open-mouth assembly, sections of other configurations, such as trapeziums or rectangles can also be utilized. It also is to be understood that any one of a number of known means can be used to form the seams of the pleats and pockets and to join the adjacent pleats of the sets. For example, stitching, stapling or gluing can be used.

When a unit pocket-type filter cartridge has been formed, it is opened from a collapsed position so that the upstream mouth portion forms a catenary, honeycomb-like inlet effect (FIGURES 1 and 4), each of the pleats and its respective pockets extending in tapered fashion from inlet mouth to downstream end in a plane perpendicular to the general plane of the pleat that lies intermediate its pleat sections substantially free from contact with each other (FIGURES 1A and 5). If desired, the filter cartridge can be mounted permanently to a header arrangement which, as disclosed, includes rigid rectangular open-ended frame member 26—made from a suitably rigid material such as metal, wood or plastic—and further includes a flexible cloth-like sock 27 fixed at one end to frame 26 and at the other end to the peripheral boundary of the filter cartridge. The flexible cloth-like sock 27 can be gas impervious or, if desired, can be formed from a suitably flexible filtering material. The sock 27 can be attached to the filter cartridge by any one of the aforedescribed stapling stitching or gluing means. It is to be noted that the pleats forming the filter cartridge can be shaped so as to eliminate sock 27, providing a peripheral boundary integral with the mouth-forming edges thereof for replaceable installation in a rigid header by some suitable clamping device (not shown).

Referring to FIGURE 6 of the drawings, there is disclosed in schematic form an embodiment of the present invention wherein pleat sets 33, including end-to-end connected pleat sections 36, and pleat sets 34, including end-to-end connected pleat sections 37, can be formed from a continuous strip of filter medium 40 which is folded back and forth upon itself about fold lines 41, 42 and 43, respectively, to form alternating parallel pleats in side-by-side relation. The pleat sets can then be seamed in the manner aforedescribed to form a filter cartridge comparable to that aforedescribed.

Referring to FIGURES 7 to 9 of the drawings, still another embodiment of the present invention is disclosed. In this embodiment, a suitably stiffened and foldable filter medium, such as filter paper, can be used. To form pocket-type filter cartridge 52 of FIGURE 7, two pleat sets 53 (FIGURE 8) and 54 (FIGURE 9) of filter medium pleats are utilized with the pleats of each set being arranged in alternating parallel side-by-side relationship. Each of the pleats of set 53 (FIGURE 8) includes a pair of pleat-forming sections 56 of filter medium of the aforedescribed stiffened and foldable type. As in the filter cartridge of FIGURES 1 through 5, it is to be understood that although only one pleat-forming section 56 of a pair of pleat-forming sections is disclosed in FIGURE 8 of the drawings, the other section of such pair is substantially identical in configuration and, to form a pleat, is placed in face relationship with the disclosed section for fastening together with such section along downstream common line 57 and along spaced side seams 58 and 59 which extend transverse to line 57. It further is to be understood that the two sections 56 comprising a pleat of set 53 can be formed from a suitable symmetrically-shaped single integral blank which is folded about common line 57 so that the sections face each other to form the pleat. In addition to spaced side seams 58 and 59 extending along the sides of a pleat of set 53, each pleat of a set is provided with spaced seams 61 intermediate to seams 58 and 59 and transverse to common line 57 to further join the facing sections 56 of the pleat and form a plurality of open-mouth pocket members in the pleat.

Positioned intermediate to seams 61 of each pocket-forming section of each pleat is a fold line arrangement which includes fold lines 62 and 63 which extend in angular fashion from base line 57 to form triangular fold panel 64. It is to be noted that panel 64 extends only a portion of the distance from common line 57 to mouth-forming edge 65 opposite common line 57. An additional fold line 66 is provided to extend from the apex of triangular panel 64 to edge 65. With the arrangement aforedescribed, it will be obvious that these fold lines serve as a means to open the pocket members of pleat 53 in fixed form in the fashion disclosed in FIGURE 7. It is to be noted that the adjacent extremities of fold lines 62, 63 and 66 can be arranged so that they do not intersect but rather are spaced apart a sufficient distance to avoid undesirable tearing stresses which might otherwise occur if the lines were to intersect.

Referring to FIGURE 9 of the drawings, each of the pleats of pleat set 54 includes a pair of pleat-forming sections 55 of filter medium comparable to that of pleat set 53. As with the pleat-forming sections of set 53, it is to be understood that although only one such section of a pair is disclosed in FIGURE 9 of the drawings, the other section of such pair is substantially identical in configuration and is placed in faced relationship with the disclosed section for securing together along the downstream common line 67 and the spaced side seams 71 and 72 to form the pleat. It further is to be understood that the two sections comprising the pleat of set 54 can be formed from a suitable, symmetrically-shaped single integral blank which is folded about common line 67 so that the sections 55 face each other to form the pleat. It further is to be understood that each pleat section of the pleat set 54 is provided with spaced seams 73 intermediate to the spaced side seams 71 and 72 and transverse to the common line 67. In addition, like pleat sets 53, pleat sets 54 are provided with angular fold lines 82 and 83 arranged intermediate to the seams 73 in a manner similar to that of FIGURE 8 to include a triangular fold panel 84 which has extending therefrom a fold line 86 to the mouth-forming edge 88 of the section.

In assembling the pleats of pleat sets 53 and 54 to form the pocket-type filter cartridge 52, the pleats of the sets are arranged in alternating parallel side-by-side relationship. As in the arrangement of FIGURES 1 to 5, although the downstream lines 57 and 67 of sets 53 and 54, respectively, are of substantially the same breadth, the mouth-forming edges 65 of the pleats of set 53 are of greater breadth than the mouth-forming edges 88 of set 54 with pleat set 53 having one more seam and thus one more pocket-forming member than pleat set 54. It also is to be noted that pocket-forming seams 61 and 73 of the two pleat sets are laterally offset from each other when the pockets are assembled as a unit. Since the breadth of the two sets differ assuming the sets are properly aligned in alternating relationship, when the pockets are expanded, a block-like shaped unit form can be obtained (FIGURE 7) by folding over a portion of the end pockets of the pleats of greater breadth as at 50. Once the sets are properly positioned in alternating relationship, the adjacent pleat sections of the two pleat sets are joined together at the mouth-forming edges 65 and 88 only. When this has been accomplished, a pocket-type filter cartridge which is collapsible in nature for ready shipment has been formed. As in the aforedescribed pocket-type filter arrangements, the pleat sections of FIGURES 7–9 are trapezoidal with straight-line mouth-forming edges 65 and 88 respectively to obtain the stress reducing catenary-like effect upon open-mouth assembly (dotted line z of FIGURE 7) and to produce a unit pleat assembly which is substantially rectangular in shape.

Figure 10:
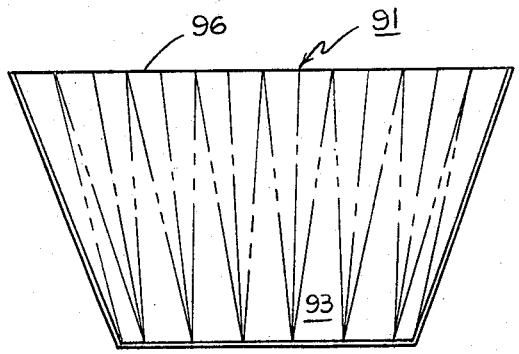
FIGURE 10 is a plan view of a pleat section of one of the pleats of a pleat set of a two pleat set which can be embodied in a further modified filter unit.

Referring to FIGURES 10 and 11 of the drawings, pleat sections 91 and 92 are disclosed. These pleat sections are substantially similar to those disclosed in FIGURES 8 and 9, the only difference being that the fold lines are such that triangular portions 93 in FIGURE 10 and triangular portions 94 in FIGURE 11 extend to the mouth-forming edges 96 and 97, respectively, of the pleat sections. It is to be understood that the pocket-type filter cartridge formed from these pleat sections is otherwise formed in a manner substantially similar to that aforedescribed for the pocket-type cartridge embodiment disclosed in FIGURES 7–9.

Figure 13:
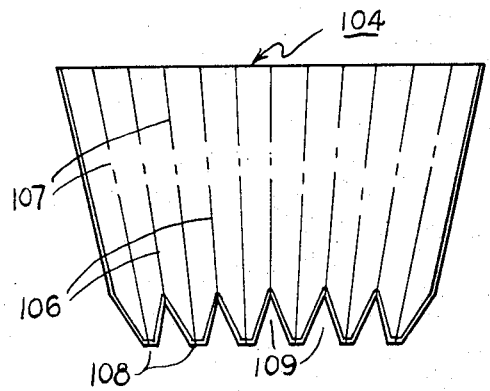
FIGURE 13 is a plan view of a pleat section of one of the pleats of the other pleat set of the two pleat set of FIGURE 12.
Figure 12:
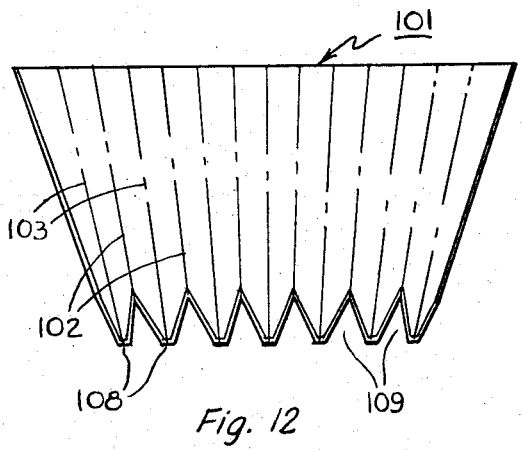
FIGURE 12 is a plan view of a pleat section of one of the pleats of a pleat set of a two pleat set which can be embodied in a further modified filter unit.

Referring to FIGURES 12 and 13 of the drawings, still another embodiment of the present invention is disclosed. In this embodiment, the triangular portions are eliminated. For example, in FIGURE 12, pleat section 101 is provided with a plurality of spaced seams 102 having fold lines 103 extending lengthwise of the pockets intermediate to the spaced seams. In similar fashion in FIGURE 13, pleat section 104 is provided with a series of spaced seams 106 having fold lines 107 extending lengthwise of the pockets intermediate to the spaced seams. When the pocket-type filter cartridge of FIGURES 12 and 13 is assembled together in a manner aforedescribed, it is to be noted that the fold lines 103 and 107 extend to downstream points 108, triangular portions indicated broadly by reference numeral 109 having been cut away along the downstream portions of each pleat forming section 101 and 104. These cut-away triangular portions serve to provide pockets terminating in downstream end cones, eliminating wrinkles which would otherwise result when the filter cartridge is erected and reducing adjacent pocket contact.

Referring to FIGURES 14 through 16, still another embodiment of applicant's invention is disclosed. In this arrangement, a pocket-type filter cartridge is provided substantially like that set forth in FIGURES 1 to 5 of the drawings. Since the arrangement of seams and darts in this embodiment is substantially like that of the embodiment of FIGURES 1 to 5, such arrangement is not described in detail herein. The only difference in the embodiment of FIGURES 14–16 as compared to that of FIGURES 1–5 is that the configuration of the pleat forming section is such that edges 113 and 115 opposite common downstream lines 114 and 116, respectively, are arced. Because of such arced configuration, the mouths of the pocket members of the filter cartridge fall in a flat plane when the cartridge is in open honeycomb position. Thus, a rectangular, block-like filter cartridge is obtained which can be readily inserted into a rectangular open-ended box for filter operations.

Referring to FIGURE 17, still another embodiment of the present invention is disclosed. In this embodiment, like pleat sections 122 are joined together and folded along common downstream line 123 and along side seams 124 and 125. As in the embodiments aforedisclosed, additional spaced seams 126 are provided intermediate to the side seams and transverse to common line 123 to divide the pleats into a plurality of open-mouth pockets. However, in this embodiment, one of the end pockets indicated by reference numeral 127 has a selected breadth less than the breadth of the other pockets of the pleat set. Accordingly, by reversing and facing every other finished pleat of the pleat set with the matching lines C–L of each pleat mating and assembling all of such pleats together, two pleat sets are provided in parallel, side-by-side relationship from the same pleat configuration with adjacent pleats of the unit having their seams laterally offset from each other. Thus, it is possible to reduce manufacturing costs, improve assembly operations and, at the same time, fold alternate end pockets adjacent the end pockets of lesser breadth in such a manner (as at 30) to produce a filter cartridge of block-like shape.

The invention claimed is:

1. A pocket-type fluid filter cartridge comprising: first and second filter pleat sets of filter medium with pleats of said sets positioned in alternating parallel side-by-side relationship, each of the pleats of each set including a pair of pleat-forming sections of filter medium joined together in end-to-end fashion along a common line and folded to face each other to form one of the pleats of said pleat sets, said pleat having spaced seams extending transverse said common line to join said facing sections of said pleat and form a plurality of open-mouth pocket members; the seams of the pleats of one pleat set being laterally offset in relation to the seams of the pleats of the other pleat set with adjacent pleat sections of alternating pleats of the first and second pleat sets joined together at the mouth-forming portions thereof only to provide a honeycomb-like arrangement of fluid inlets when said filter cartridge is placed in open position during fluid-treating operations.

2. The apparatus of claim 1, means to hold the mouths of said pocket members in open position, the mouths of said pocket members lying in a curved surface, the curve of which is of catenary-like shape when said filter cartridge is placed in open position.

3. The apparatus of claim 1, wherein said first and second filter pleat sets are formed from an identical pleat configuration, one of the end pockets of which is narrower breadth than the remaining pockets of said pleat with the pleats of one set being positioned in reverse relation to those of the other set to provide the laterally offset seam arrangement of adjacent pleats.

4. The apparatus of claim 1, said pocket-forming seams of said pleat sets having a tapered dart-like configuration with a lateral breadth at their intermediate portions greater than at their extremities to provide clearance between adjacent pockets of adjacent pleats.

5. A pocket-type fluid filter cartridge comprising. first and second filter pleat sets of filter medium with pleats of said sets positioned in alternating parallel side-by-side relationship, each of the pleats of each set including a pair of pleat-forming sections of filter medium joined together in end-to-end fashion along a common line and folded to face each other to form one of the pleats of said pleat sets, said pleat-forming sections having a greater breadth along the edges opposite said common line than along said common line, said pleat having spaced pocket section forming seams extending transverse said common line to join said facing sections of said pleat and form a plurality of open-mouth pocket members; the seams of the pleats of one pleat set being laterally offset in relation to the seams of the pleats of the other pleat set with adjacent pleat sections of alternating pleat sets joined together at the mouth-forming portions thereof only to provide a honeycomb-like arrangement of fluid inlets when said filter cartridge is placed in open position during fluid-treating operations.

6. The apparatus of claim 5, said pleat sections having said edges opposite said common joint lines of arced configuration whereby said mouths of said pocket members fall in a common flat plane in honeycomb-like fashion when said filter cartridge is in open fluid-treating position.

7. The apparatus of claim 5, said pleat sections being of trapezoidal configuration when said cartridge is in collapsed position to create tapered pleats when said cartridge is expanded.

8. A pocket-type fluid filter cartridge comprising: first and second filter pleat sets of filter medium with pleats of said sets positioned in alternating parallel side-by-side relationship, each of the pleats of each set including a pair of pleat-forming sections of stiffened filter medium joined together in end-to-end fashion along a common line and folded to face each other to form one of the pleats of said pleat sets, said pleat having spaced seams extending transverse said common line to join said facing sections of said pleat and form a plurality of open-mouth pocket members, said pocket members having fold lines extending intermediate said seams to enhance the opening of said pockets; the seams of the pleats of one pleat set being laterally offset in relation to the seams of the pleats of the other pleat set with adjacent pleat sections of alternating pleats of the pleat sets joined together at the mouth-forming portions thereof only to provide a honeycomb-like arrangement of fluid inlets when said filter cartridge is placed in open position during fluid-treating operations.

9. The apparatus of claim 8, said pocket members being cut away at preselected points along said common line to taper into substantially downstream end cones.

10. The apparatus of claim 9, said pleat forming sections being of trapezoidal configuration when said cartridge is in collapsed position with a greater breadth along the edges opposite said common line than along said common line, said fold lines of said pocket members including a triangular fold panel extending from said common line toward the edges opposite said common line.

References Cited

UNITED STATES PATENTS

| | | | |
|---|---|---|---|
| 2,731,106 | 1/1965 | Seck | 55—381 |
| 2,897,971 | 8/1959 | Gewiss | 210—487 |
| 2,980,208 | 4/1961 | Neumann | 55—500 |
| 3,008,542 | 11/1961 | Steele | 55—341 |
| 3,058,594 | 10/1962 | Hultgren | 210—493 |
| 3,273,321 | 9/1966 | Bauder et al. | 55—341 |
| 3,276,190 | 10/1966 | Babbitt et al. | 55—341 |
| 3,309,848 | 3/1967 | Schwab | 55—489 |

FOREIGN PATENTS

| | | |
|---|---|---|
| 1,222,727 | 1/1960 | France. |
| 1,275,496 | 10/1961 | France. |
| 242,136 | 1/1947 | Switzerland. |

HARRY B. THORNTON, *Primary Examiner.*

B. NOZICK, *Assistant Examiner.*